8292X
J JACOBS.
Plow.
Patented July 8, 1834
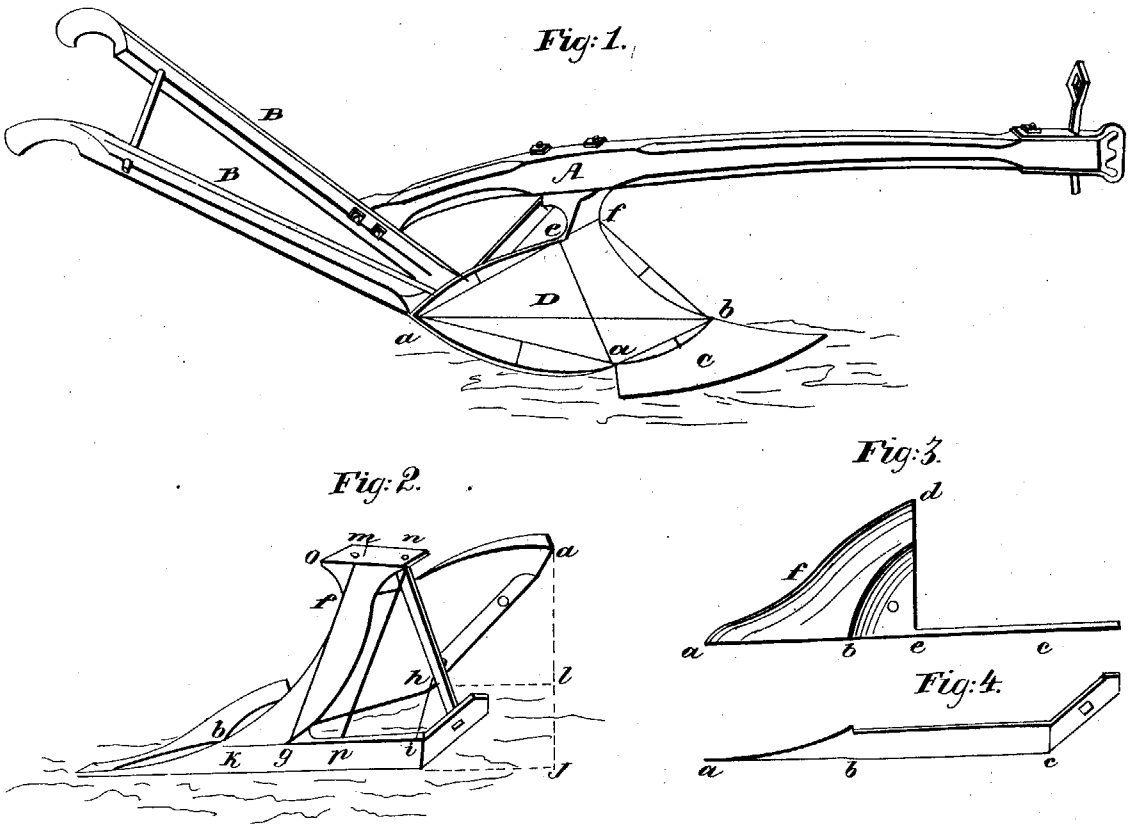
N. PETERS, PHOTO-LITHOGRAPHER, WASHINGTON, D. C.

(July. 8. 1834.) 157.

James Jacobs, of Maysville, Ky. 8292X

Letters Patent.

The schedule referred to in these Letters Patent, and making part of the same, containing a description in the words of the said James Jacobs himself, of his improvement in Ploughs.

---

To all to whom these presents shall come:- Be it known that I, James Jacobs of Maysville in the County of Mason and State of Kentucky have invented a new and useful improvement in ploughs. and that the following is a full and exact description of the construction and operation of the said machine as invented or improved by me. The mould board is to be made of cast iron and the shape of the surface, in its various concavities and convexities may be thus obtained so as to present that form to the furrow slice, which I consider the best adapted to produce the end desired.

Fig. 1. represents the right hand view of my "cultivating plough" and the letters designate the different points from which the lines requisite to form the surface are drawn. viz. from the extreme points of the length of the mould board, or in other words from the point a to b a straight line is to be struck from the one to the other of six inches and two eighths in length, and from the middle of this line, a perpendicular is let fall of five sixteenths of an inch in length to the surface of the mould board, beneath the centre of said line across the length. a line is next to be struck from c. to d. of ten inches and thirteen sixteenths in length. and a perpendicular let fall from the centre of this line to the surface of the mould board - will be two eighths of an inch in length. from the letter d to a. a line is to be struck of four inches and three eighths in length, and a perpendicular let fall from the centre of this line to the surface of the mould board will be of three eighths of an inch in length. and a line from said centre to the hinder circular edge of the mould board, will be of three eighths of an inch in length also. From the point a to the point f. a line is to be struck of four inches and five eighths of an inch in length, and a perpendicular raised from the centre of this line to the top of the circular part of the Drawing

8292X upper edge of the mould board, will be five sixteenths of an inch in length - From the letter f. to the letter b, a line is to be struck of three inches in length - on the front edge of the mould board and a perpendicular let fall from the centre of this line to the said front edge, will be of five sixteenths of an inch in length from the point d to the point b, a line will be struck of two inches, and two eighths in length and a perpendicular raised from the centre of this line to the thin edge of the mould board will be three sixteenths of an inch long. The portion of the surface of the mould board contained between each point, or extremity of these original straight lines struck as above described is to be shaped upon that segment or portion of a circle; as will lie between said points having the perpendicular for the height of the arch. a straight edge applied to the upper edge of the face of the mould, and moved down, will show that there, the line will be nearly straight, but in-creasing in convexity gradually, as it descends in proportion as the length of the shear diminishes towards the bottom. Fig. 2. represents a left hand view of the mould board, on which a line drawn from the point K. to 3. will be one inch and three eighths in length. The point K. is to drop one eighth of an inch below the point B from a horizontal line drawn from b to g. From the point K. to g. the length of a line struck between them, will be one inch and three eighths in length - a line drawn along the bottom from the hinder part of the mould board to the extremity of the bar, from the points h. to i. will be two inches and one eighth in length. a line is now to be let fall perpendicularly from the point a, to the horizontal plane on which the flat part of the under side of the mould board rests designated by the point I (being that of the intersection) and another line at right angles with it, being continued from the point I till it intersects the line running along the face of the slice from K. to g. parallel with the bar at the point J, gives a line struck from I to J. of three inches and two eighths in length which gives the correct width of the board behind from outside to outside. On the back of the inside of the mould board a flat shoulder is formed of about two inches in length increasing, in thickness of the mould towards the upper part, to about two thirds more of the average thickness of the mould throughout. and thereby presents a flat surface upon which the right handles is to be bolted. on the line K.O. as a base a perpendicular is to be raised through f. to the point m. of three inches in length. and another parallel to it, at an inch distant of two inches, and five eighths in height. The distance from m. to o. will be a projection of one quarter of an inch forward; The curved line of the front edge of the Slice, continues its direction beyond f. about half the distance on to m. where it projects forwards about one quarter of an inch, and is there rounded off to the point o, thereby leaving sufficiently shoulder for the hole, through which the front bolt is to be fastened on the face of the mould Fig. 1. the concave surface from d to e. continues in the same slope, to about two thirds of the distance, above the neck, over the line f.e. whence it projects forwards in a concave sufficiently deep for the reception of the head of the front bolt, terminating at the top, under the beam in a sharp edge. having the corner rounded off.

The back part of this head, runs behind about one quarter of an inch beyond the curved line of the back part of the Slice, thereby leaving space for the insertion of a hole, to be cast for the reception of the ends of the brace that extends from the heel of the bar, to said hole in the head.

Fig. 3. is a view of the shear where a line from the point a, to the point b extends two inches and three sixteenths of an inch, in length. and a line from b, to c. is of three inches and five eighths in length, from the point b to e. the distance is to be one inch and five eighths along the bar. The width of the shear from e to d. is two inches and five eighths, and the edge from heel to point is sharp throughout. that part contained between the point d and f. is to be of a circular form, and the remainder of the point, from f. to a, is rounded at the extremity of said point. The depth of the bar at b, in fig. 4. is to be three eighths of an inch and at e. it will be seven sixteenths, the same depth will be continued to c. This shear and bar is to be made of wrought iron - These proportions are reduced to one fourth of those of a plough of full size, so that in constructing a mould for my "Cultivating Plough" of a plough for use, these proportions are to be increased accordingly.

The stocking is to be done in the usual manner. a plough mould board constructed upon the principles, and according to the lines laid down in the above description, presents decided advantages for general cultivation

8292X over others. - The length of the face of the mould board, and the angle at which
it parts from the bar, occasions it to present an inclination to the front suffi-
ciently abrupt, to break the furrow slice as it rises, from the slope of the shear
in such a manner as to roll it over, completely pulverised and in the best
possible situation for promoting the growth of the crop, so that the earth is ren-
dered light and soft, presenting the appearance obtained by harrowing.
Different soils will in some cases require ploughs of different construction
but my cultivating plough will be found to answer well in most sit-
-uations - but more particularly where the soil is not of an extraordinary
hard and stiff texture -
My claim for the construction of this above described mould board lies
on the concavities and convexities produced, on the surface to obtain the
rules laid down for drawing the lines, on which the segments of the different circles are to be struck according [illegible]
desired and by means of, or according to the arch given by the perpendicular
raised from them.
In testimony that the above is a full and correct description of my
plough, as invented or improved by me, I have hereunto set my hand
this twenty-seventh day of June in the year eighteen hundred and
thirty-four.

James Jacobs

Witnesses
Henry Stone
Robt. Clarke

Exd.
W.G.C.

[illegible]